United States Patent [19]
Murphy

[11] 3,815,970
[45] June 11, 1974

[54] STEREO ATTACHMENT ACCESSORY FOR CAMERAS

[76] Inventor: Gregory I. Murphy, 4042 Phoenix St., Concord, Calif. 94521

[22] Filed: Feb. 26, 1973

[21] Appl. No.: 335,487

[52] U.S. Cl............ 95/18 R, 350/130, 342/57, 355/22
[51] Int. Cl. ............................................ G03b 35/08
[58] Field of Search .......... 95/18 R; 352/57, 58, 60; 355/22; 353/7; 350/202, 130

[56] References Cited
UNITED STATES PATENTS

| | | | |
|---|---|---|---|
| 1,964,968 | 7/1934 | Warmisham | 352/60 |
| 2,360,322 | 10/1944 | Harrison | 95/18 R |
| 2,362,790 | 11/1944 | Austin | 95/18 R |
| 2,413,996 | 1/1947 | Ramsdell | 342/60 |
| 2,922,350 | 1/1960 | Fischer et al. | 95/18 R |

FOREIGN PATENTS OR APPLICATIONS

| | | | |
|---|---|---|---|
| 294,360 | 1/1954 | Switzerland | 95/18 R |
| 564,302 | 9/1944 | Great Britain | 95/18 R |

Primary Examiner—Richard L. Moses
Attorney, Agent, or Firm—Phillips, Moore, Weissenberger, Lempio & Strabala

[57] ABSTRACT

An attachment accessory for cameras to enable taking stereo pair photographs with a normal angle of view on a single film frame having provision for ensuring alignment. Additional embodiments include an adjustment feature to enable use with various cameras including those utilizing a viewfinder.

9 Claims, 9 Drawing Figures

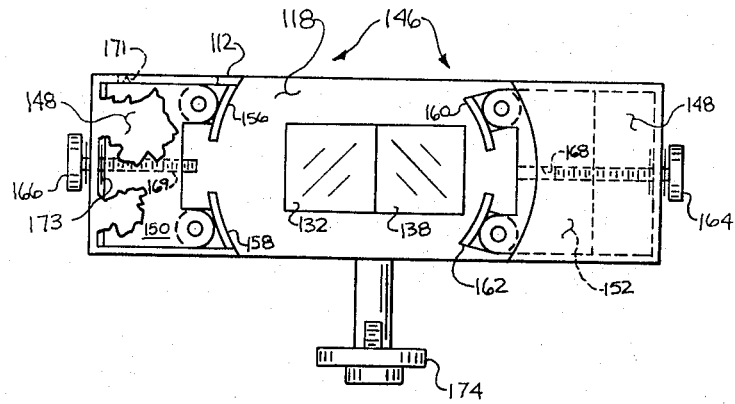
Fig 7
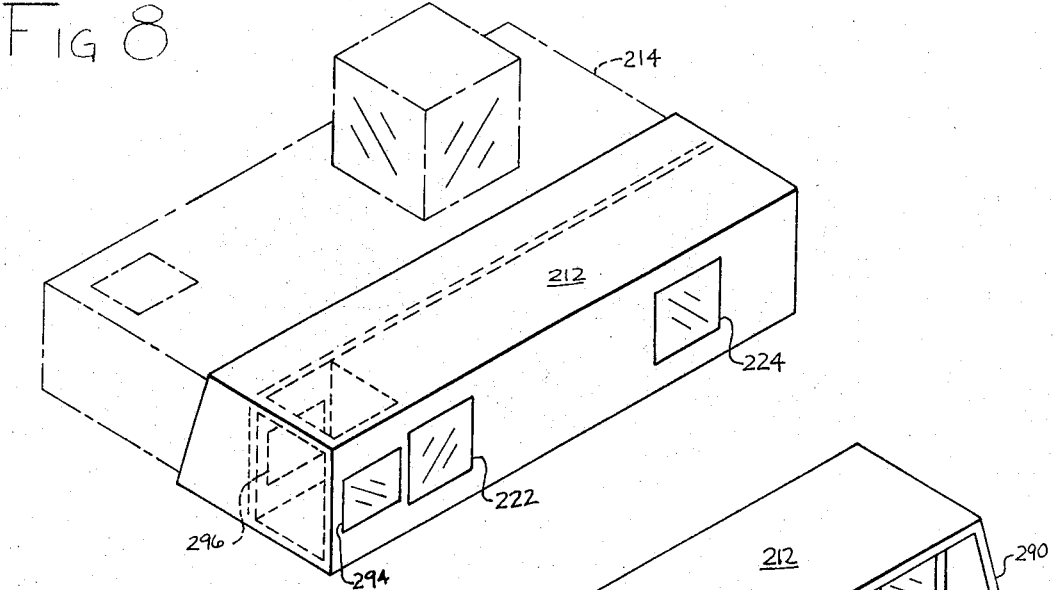
Fig 8
Fig 9

1

STEREO ATTACHMENT ACCESSORY FOR CAMERAS

BACKGROUND OF THE INVENTION

This invention is directed to an attachment accessory device utilizable with most common cameras to enable the taking of stereo pair photographs for subsequent stereoscopic viewing. More particularly, this invention relates to a stereo attachment for cameras which produces a pair of stereoscopically related images with a normal angle of view on a film frame.

A number of devices are extant which will produce stereoscopic photographs which can be directly viewed or transparencies which can be projected for viewing. The stereo camera is a special-purpose device which solely produces still stereo pair pictures. Since it uniquely produces stereo pictures, the stereo camera lacks versatility. Additionally, it is costly both in terms of initial purchase as well as use due to the fact that it uses double the amount of film as a regular camera and requires a special photographic film. To overcome some of the disadvantages of the stereo camera, various devices have been developed which are merely attached to a regular or conventional camera to produce stereo pair images on a single film frame. These stereo cameras and stereo accessory attachments for cameras take a number of forms as witnessed by U.S. Pat. Nos. 1,482,069; 1,655,850; 1,871,281; 2,299,002; 2,413,996; and 2,736,250. However, certain problems exist with such current stereo camera devices. One main problem is engendered by the entire lack of lenses in such stereo accessory devices which rely only on mirrors or prisms to produce the film image for the camera. The angle of view with such devices is only about 20 degrees as opposed to the 40° to 65° angle of view of the normal camera. Furthermore, each one of the stereo pair images produced by such a device is of an awkward shape, being a vertically oriented, rectangular shape about half as wide as it is high.

Stereo accessory devices for cameras also require proper alignment with the camera in order to work properly since any misalignment can result in improperly projected images and unviewable pictures. Past attempts to solve this alignment problem have utilized rather complex means. For example, one such device employs a pair of bubble levels for alignment, one of which is permanently mounted on the stereo accessory and the other of which is glued or otherwise affixed to the camera itself. Such devices are difficult to operate and proper alignment is not always assured.

SUMMARY OF THE INVENTION

An object of this invention is to overcome the above, briefly described problems by providing an improved stereo accessory for cameras.

The invention takes the form of a camera stereo attachment comprising a housing having a lens set, reflecting means and for producing a stereo pair of images on a single film frame with a normal angle of view of from 40° to 65°. The invention further comprises self-alignment features adapted for mating with corresponding features on a camera which ensure proper positioning of the attachment; that is, cause the horizontal axis of the attachment and camera to be parallel. A strap is used to retain the attachment on the camera. Alternatively, an adjustable clamping mechanism is provided for centering and holding the camera with relation to the attachment. A scale having indicia thereon facilitates proper setting of the clamping mechanism to accommodate various diameter lenses. An integral composition and aiming means may be provided for cameras incorporating a viewfinder.

The above and other objects and advantages of the present invention will become more readily apparent by having reference to the following description and drawings.

BRIEF DESCRIPTION OF THE DRAWINGS

FIG. 7 is a rear elevational view of the same, partially broken away also, to show details thereof and showing an alternate position of the movable clamp mechanism;

FIG. 8 is a top quarter, isometric view of yet another embodiment shown mounted on a representative camera; and FIG. 9 is a rear view of the same.

DETAILED DESCRIPTION

Figure 1:
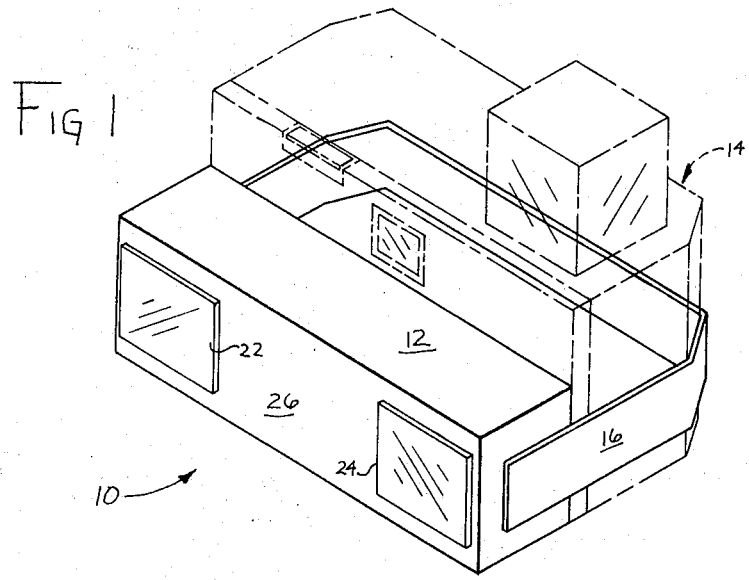
FIG. 1 is a top-quarter, isometric view of a stereo attachment embodying the present invention shown mounted on a representative camera in phontom.
Figure 3:
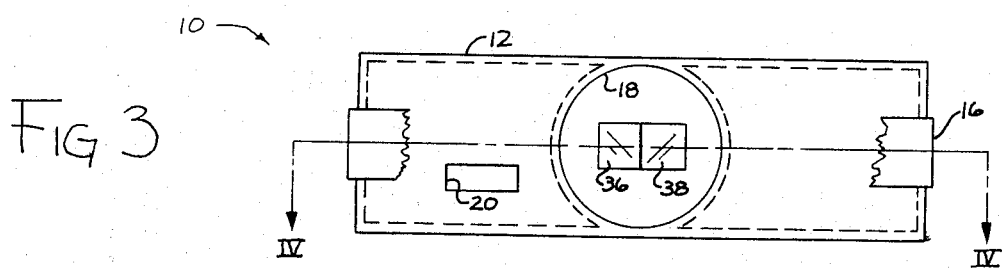
FIG. 3 is a rear elevational view of the stereo attachment.
Figure 4:
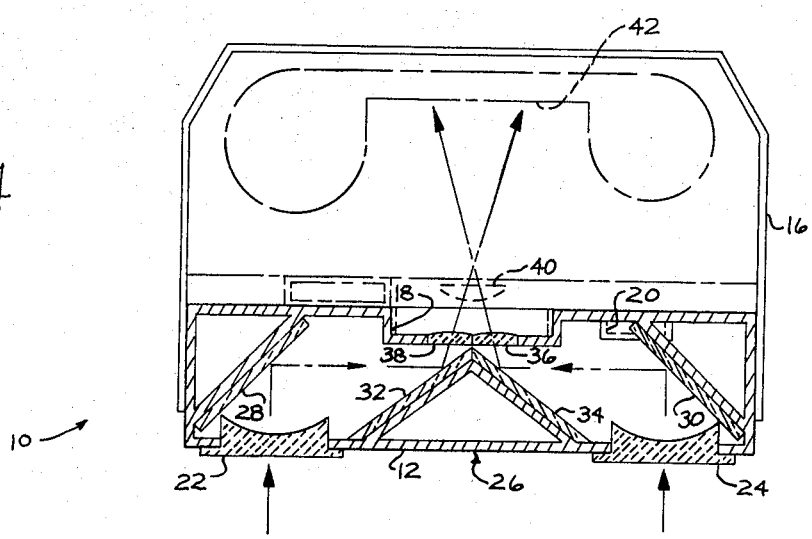
FIG. 4 is a cross-sectional view of the same taken along lines IV—IV in FIG. 3.

Turning to FIG. 1, there is shown generally at 10 a stereo attachment comprising a generally rectangular housing 12 mounted on a representative camera such as the Kodak Instamatic camera in phantom at 14. An attachment means or strap 16 of resilient material is used to secure the housing to the camera. As seen in FIGS. 3 and 4, the back wall of the housing incorporates recesses which ensure proper alignment of the stereo attachment with respect to the camera. For the camera shown, a cylindrical lens recess 18 and a rectangular shallow recess 20 are adapted to receive camera projections and thereby align the stereo with the camera attachment. Obviously, the alignment features may be modified to accept other cameras having different frontal projections.

Figure 2:
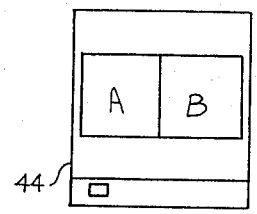
FIG. 2 is a front elevational view of a single film frame illustrating the stereo pair images produced by the stereo attachment.

As seen in FIG. 4, light rays from an object to be photographed are first received and refracted through a pair of spaced-apart, frontal lenses 22, 24 in front wall 26 of the attachment. The rays are then reflected from a first pair of reflectors 28, 30 and then a second pair of reflectors 32, 34. The first pair of reflectors are mounted at an angle of 45 degrees and the second pair at an angle of 40 degrees to the plane of the front wall 26. Light rays then pass through and are refracted by a pair of juxtaposed rear lenses 38, 36, and the camera lens 40 to the film plane 42. Two generally square stereoscopic images A and B are produced in juxtaposed relation on a single photographic film frame 44 as seen in FIG. 2. The reflectors are of a surface reflective material. The lenses are selected to produce an angle of view of from 40°–65°. Lenses to the following specification have proved suitable to produce a 60° angle of view: front lens, $f=1/-2.00$, diopter (−2.00 sphere); rear lens, $f=1/12.5$, diopter (+12.50 cup).

Figure 5:
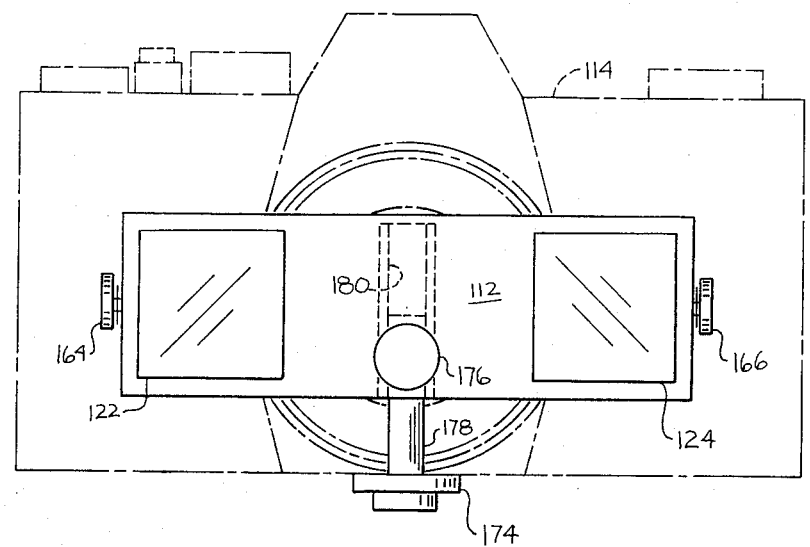
FIG. 5 is a front elevational view of another embodiment of the invention shown mounted on a representative camera in phantom.
Figure 6:
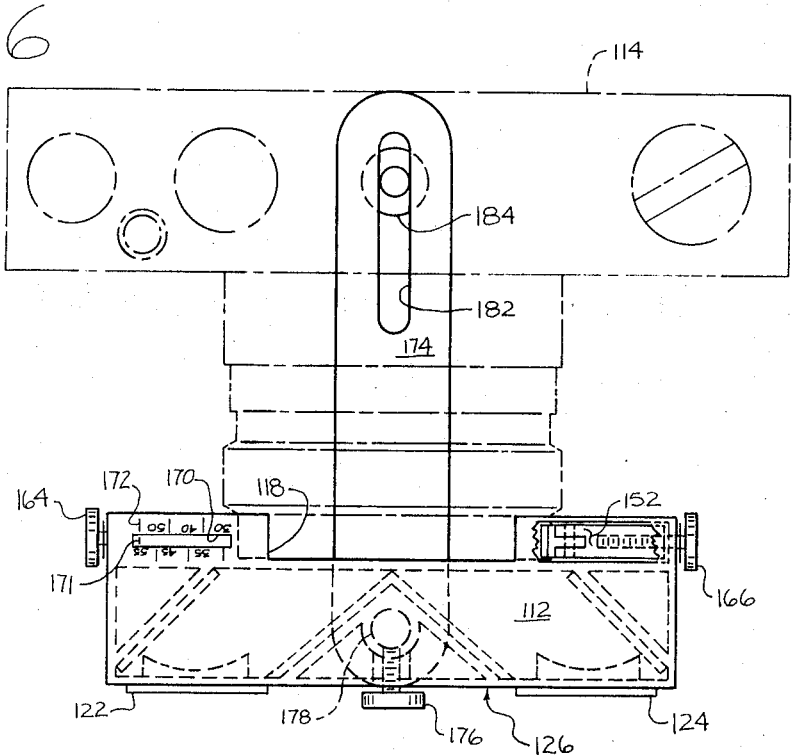
FIG. 6 is a top view of the same, partially broken away, to show details thereof.

FIGS. 5–7 show a second embodiment of the invention especially adapted for use with cameras having lenses greater than 30 mm in diameter such as 35 mm or motion picture cameras. The basic difference between this and the prior embodiment is the provision of a clamping mechanism 146 within the back wall 148 of the housing 112 for centering of the camera lens barrel. As best seen in FIG. 7, the clamping mechanism includes a pair of clamp blocks 150, 152, which may be individually advanced into cylindrical lens recess 118 from retracted positions radially outward of the lens recess and on the same line of co-action. Each clamp block has a pair of upper and lower arcuate pads pivotally attached thereto to ensure proper alignment when gripping the camera lens barrel. The clamp blocks are advanced or retracted by turning thumb screws 164, 166 which are threadedly received in corresponding bores 168, 169, in the clamp blocks. A snap ring 173 or equivalent prevents movement of the thumb screw with respect to the housing 112. As seen in FIGS. 6 and 7, raised indicia 171 on the top of the clamping block 150, which is viewable through an elongated slot 170 cut out of the top of the housing, facilitates visual positioning of the clamp blocks by means of a scale of indicia 172 which may be calibrated for lens barrels having common millimeter diameters. For example, to center the attachment on a 55 mm lens barrel, thumb screw 164 is turned until indicia 171 is aligned with 55 mm on the scale 172. Thumb screw 166 is then turned to advance clamp block 152 against the lens barrel, thus centering the lens barrel within lens recess 118. At this point, the alignment of the attachment may be secured by utilizing alignment bar 174. By turning thumb screw 176 threadedly secured in front wall 126, the housing 112 is secured to the bar by means of rod 178 fixed perpendicular thereto and slidably received in perpendicular bore 180. The other end of the bar is slotted at 182 to enable attachment to the tripod socket of the camera by means of a thumb screw 184. When it is necessary to adjust the camera lens aperture by rotating the lens, one clamp block is loosened and then re-tightened when the adjustment has been made.

FIGS. 8 and 9 illustrate a third embodiment using the same basic optics but provided with a viewfinder for use with the viewfinder of a camera such as the Kodak Pocket Instamatic camera shown in phantom at 214. With this embodiment, the alignment means comprises extensions of the top, bottom and side walls of the housing 286, 288, 290, 292, respectively, which serve to encompass the frontal face of the camera. Thumb screw 284 is adapted to mate with the tripod mounting socket. A recess 220 may be provided to mate with a camera feature such as a lens cover.

A lens set 294, 296, consisting of a pair of lenses in line may be provided at one end of the housing 212 to mate with the camera viewfinder to aid in aiming and composition. An example of operative specifications would be: front lens: −17.0 D, back lens: +11.5 D.

It is to be understood that the foregoing description is merely illustrative of the preferred embodiments of the invention and that the scope of the invention is not to be limited thereto, but is to be determined by the scope of the appended claims.

What is claimed is:

1. A stereo attachment for cameras comprising,
a housing,
means adapted for attaching and aligning said housing to a camera, and
means in said housing for producing a stereo pair of images on a film frame having an angle of view of at least 30°,
said last named means comprising a pair of frontal lenses adapted for receiving and refracting light rays,
a pair of rear lenses for further refracting said light rays prior to projection through a camera lens and onto the film frame in the camera, and
a plurality of reflectors intermediate said frontal and rear lenses for directing light rays from said frontal to said rear lens.

2. The invention of claim 1 wherein said means for attaching and aligning comprises extensions of said housing adapted to partially encompass a camera.

3. The invention of claim 1 wherein said housing defines a front wall and a rear wall in spaced parallel relation therewith, said front lenses being mounted in spaced apart relation in said front wall, said rear lenses being mounted in juxtaposed relation in said rear wall and centrally disposed between and inwardly of said front lenses, said plurality of reflectors comprising a first pair of reflectors, one of each pair being located in said housing in a position to receive light rays through one of said frontal lenses and reflect said light rays to a second pair of reflectors located so as to receive said light rays and direct them through said rear lenses.

4. The invention of claim 3 wherein said first pair of reflectors are mounted at an angle of 45° and said second pair of reflectors an angle of 40° to the plane defined by said housing front wall.

5. The invention of claim 1 wherein said means for attaching and aligning comprises recesses in said housing back wall adapted for mating with camera projection features.

6. The invention of claim 1 wherein said means for attaching and aligning comprises a generally elongated strap fixed to said housing adjacent each end and adapted for partially circumscribing a camera.

7. The invention of claim 1 wherein said means for attaching and aligning comprises clamp means in said housing adapted for gripping a camera barrel.

8. The invention of claim 7 wherein said clamp means comprises a plurality of clamps movable into and out of gripping relation with a camera lens barrel and indicia on at least one of said clamps movably related to an indicia scale on said housing for adapting said attachment to various diameter lens barrels.

9. The invention of claim 1 further including a lens set operatively mounted to said housing adapted for mating with the viewfinder of a camera for facilitating aiming and composition.

* * * * *